Sept. 9, 1941.    T. A. RICH    2,255,473
IMPULSE MEASURING AND RECORDING APPARATUS
Original Filed Nov. 26, 1938
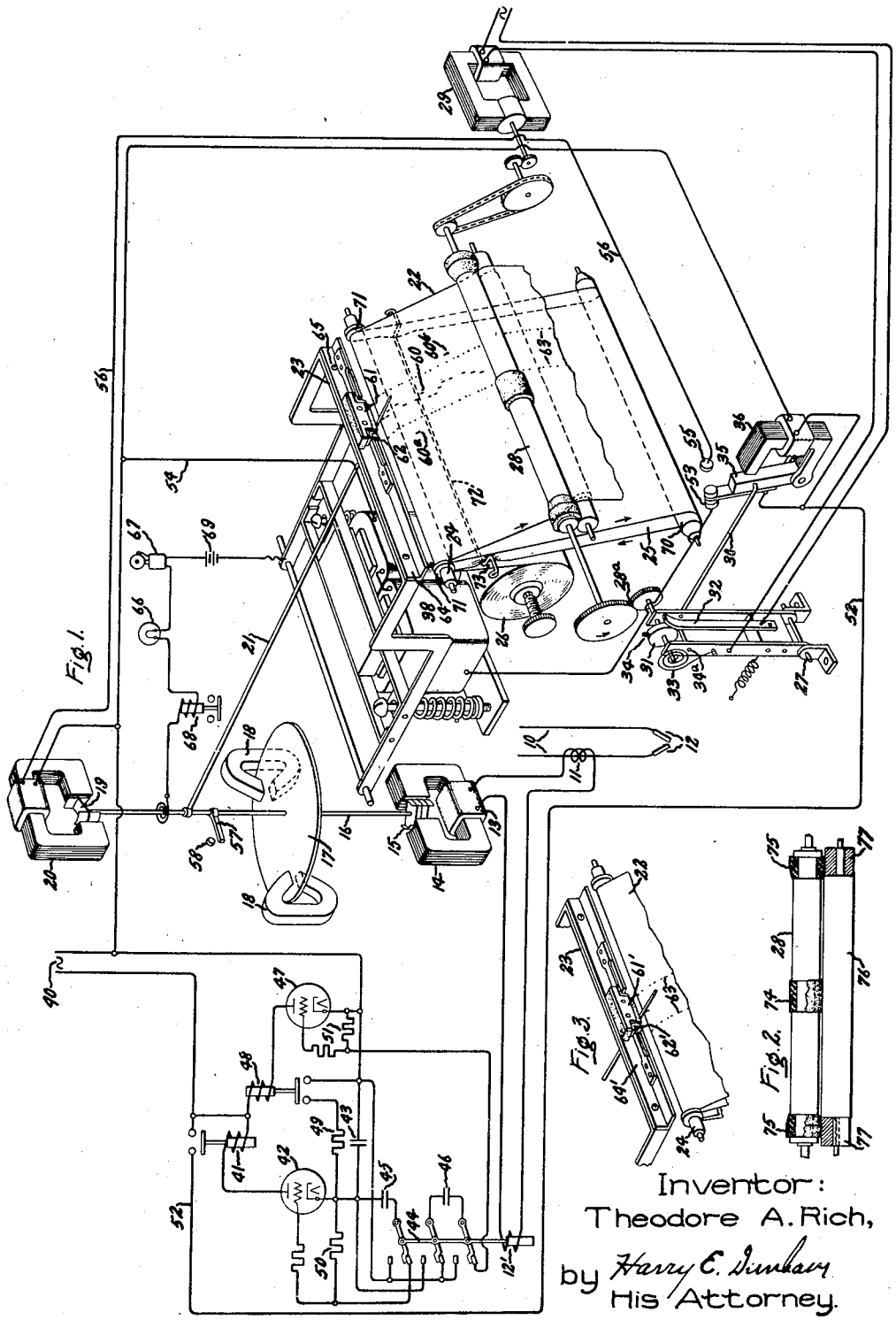
Inventor:
Theodore A. Rich,
by Harry C. Dunlavy
His Attorney.

Patented Sept. 9, 1941

2,255,473

UNITED STATES PATENT OFFICE 2,255,473

IMPULSE MEASURING AND RECORDING APPARATUS

Theodore A. Rich, Schenectady, N. Y., assignor to General Electric Company, a corporation of New York Original application November 26, 1938, Serial No. 242,543. Divided and this application April 24, 1939, Serial No. 269,805

4 Claims. (Cl. 250—27)

My invention relates to apparatus for measuring and recording rapidly recurring current impulse phenomenon of varying magnitude and duration. The apparatus of my invention is particularly adapted for measuring and recording the consistency performance obtained during electric welding operations, and the invention will be explained as for such purpose, but it may be used for other purposes.

In connection with electric welding operations, it is desirable to measure and record the factors influencing each welding operation simultaneously with the welding operation in order that the operator may have a continuous record to guide him in his work and to assure that the welding operations meet the exacting specifications necessary for reliable work. The most important factors are the heating rate of the welding current and its duration, the pressure and area of electrodes, and the conditions of surfaces. The measurement and control of pressure, area and surfaces is readily measured by commonplace means. The device here described measures the ampere-squared-seconds of the welding current.

This application is a division of my application Serial No. 242,543, filed November 26, 1938, on an Impulse measuring and recording apparatus. Said parent application contains claims directed primarily to the subject matter of the novel galvanometer recorder described herein. The present application contains claims directed to a novel timing control for the galvanometer recorder. Another divisional application filed concurrently herewith contains claims directed to certain novel features of the recording apparatus described herein.

The features of my invention which are believed to be novel and patentable will be pointed out in the claims appended hereto. For a better understanding of my invention reference is made in the following description to the accompanying drawing in which Fig. 1 represents a wiring diagram in which my improved measuring and recording apparatus is shown in perspective and is arranged for the purpose of recording the ampere-squared-seconds of spot welding current impulses; Fig. 2 shows details of the chart-advancing rolls; and Fig. 3 shows how a marking feature of the recorder may be varied.

In the drawing, 10 represents the power cables leading to the electrodes 12 of spot welding equipment. The control apparatus which is generally provided in the power supply to electric welders is not shown. The apparatus which is shown is that embodying the present invention for measuring and recording a quantity proportional to the heat energy consumed in the welding operations at the electrodes for consecutive welding operations. These welding operations may be repeated as often as one hundred times or more a minute, and each operation is accompanied by a current surge through leads 10. The apparatus of my invention responds to these current surges to produce individual records of the ampere-squared-seconds energy of each surge. This requires that the measuring and recording of a given surge must be completed in a time interval of less than one second in duration and the apparatus conditioned to measure and record the next surge. The more important aspects of my invention concern features which enable the electric measuring and recording apparatus to perform their functions accurately in the short time periods mentioned.

In the circuit of one of the power leads 10 is represented a current transformer 11 of a high current reducing ratio. The secondary of the transformer supplies greatly reduced but proportional current impulses to a relay 12' and to the measuring coil 13 of a recording galvanometer. The purpose of relay 12' and the vacuum tube and relay circuits shown generally above this relay are primary to control the timing of the recording operation and the reconditioning of the galvanometer after each surge measurement. However, before attempting a detail explanation thereof, it will be best to describe the galvanometer recorder.

The galvanometer comprises essentially three parts, first a measuring element energized by coil 13, and having a two-pole stationary magnet 14 and a two-pole magnetic armature 15 secured to the rotary shaft 16; second, a damping element consisting of a disk 17 of conducting material secured to shaft 16 and one or more stationary permanent magnets 18 which convey a damping flux through the disk 17 for damping purposes; and third, a zero return element consisting of a two-pole magnetic vane 19 secured to shaft 16 and a two-pole stationary field magnet 20 which when energized tends to turn its vane 19 into alignment with its pole pieces at approximately the zero position of the shaft 16. A recording arm 21 is secured to shaft 16, and its outer end extends freely between a record sheet 22 and a printing rod 23.

The record printing apparatus may comprise a printing platten 24 in the form of a roller beneath the printing rod 23. About drum 24 is a belt 25 of carbon paper or its equivalent. The record sheet 22 is preferably sufficiently thin as to be transparent so that when the printing rod 23 forces pointer 21 down against the printing platten with the record sheet and carbon paper intervening, a mark is made on the under surface of the record sheet of the position of pointer 21, which mark is visible through the transparent sheet. 26 represents a supply roll for the record sheet, and 28 a driving drum for the record sheet. 29 is a small timing motor used for driving the drum 28 for advancing the chart 22. The advance of chart 22 rotates roller 24 and since the carbon paper belt 25 is about roller 24 in contact with chart 22 the carbon paper belt 25 is also advanced by motor 29. The carbon paper belt 25 is advanced over roller 24 at about the same rate as the record sheet is advanced above it, but, except during the instance of printing, the carbon paper does not transfer marking material to the record sheet.

In order automatically to stop the advance of the record sheet when welding operations are temporarily discontinued, I have provided a special contact device for opening the circuit of the timing motor 29. The contacts of this device comprise a metal wheel 31 and a resilient metal brush 32 bearing against the wheel 31 and included in the circuit of motor 29.

As here shown, the metal wheel 31 is urged in a counterclockwise direction by a light spiral spring 33 and has an insulating finger 34 extending from its periphery which, if rotated clockwise against the upper end of contact 32, forces the contact away from wheel 31 to open the circuit of the timing motor 29. This contact mechanism is pivotally mounted at 27 and is connected with the armature 35 of a relay 36 by rod 30. This relay 36 is energized following the occurrence of a welding surge as will be described subsequently. When the relay 36 is deenergized, the metal wheel 31 is rotated in a clockwise direction since it is on a shaft geared at 28a to the shaft of roller 28 driven by timing motor 29 and in this condition, which is that represented in the drawing, wheel 31 will be driven clockwise so long as the timing motor remains energized through contacts 31 and 32.

It is seen that in a short time interval, if the relay 36 is not energized, insulating finger 34 will rotate against spring finger 32 and move it away from wheel 31 to break the timing motor circuit.

This condition of affairs will remain until relay 36 is energized. When this happens the contact assembly is swung to the right about pivot 27 and the gears at 28a are separated. Now spring 33, which has been wound up, can rotate 31 counterclockwise until finger 34 is stopped by contact with a stop 34a. Finger 32 is now in contact with wheel 31 and the timing motor starts in operation to advance the record sheet. Ordinarily when surges to be recorded are coming in at a rate of say once per second, the finger 34 does not reach contact 32 but is repeatedly returned against its stop and the timing motor circuit remains energized to advance the record sheet continuously, but as soon as relay 36 remains deenergized for a somewhat longer period, which period may be made anything desired, the timing motor circuit is again opened and remains open until the next surge to be recorded occurs. It will be evident that with this arrangement the record sheet will always be advanced so as to leave a clean portion of the record sheet in recording position when the motor stops and hence the first impulse that comes in and starts the timing motor will be properly recorded. This expedient not only saves considerable recording and carbon paper, but it saves wear and tear on the recording apparatus and useless operation of the timing motor. Delays incident to renewing the recording paper supply are reduced, and the records which are obtained are condensed and easier to study than if scattered over an unnecessary length of record sheet.

The printing rod 23 extends over the recording swing of pointer 21 and may be resiliently suspended and provided with a magnet 38 which will be momentarily energized at the proper time, as hereinafter explained, to perform a recording operation.

The deflecting, damping and zero return torques of the recorder are large in comparison with the moment of inertia of the moving parts mounted on shaft 16.

In the iron vane type of measuring instrument here used the deflecting torque is proportional to the square of the current (I) flowing in its coil 13. The damping torque is proportional to the angular velocity ($w$) which is equal to a damping constant K times $I^2$. The angular travel of the pointer from a zero position, when there is no zero restoring torque and neglecting friction and moment of inertia, is equal to the average angular velocity $KI^2$ multiplied by the time duration ($t$) of the surge. The moment of inertia of the moving parts of the instrument is made small in comparison with the torques referred to and therefore does not materially alter the deflection characteristics of the instrument, but to the extent that it does it may be compensated for according to the following explanation. That small portion of the up-scale torque of the instrument during acceleration of the pointer up-scale, which is used up in overcoming the inertia of the moving parts is substantially equivalent to the kinetic energy remaining in the moving parts when the up-scale torque ceases. This will cause the pointer to continue to be moved up-scale until this energy is used up by the opposing damping torque. If then at the end of a surge we allow pointer 21 to move up-scale until it stops before we print the record, the recording position of the pointer will be proportional to $I^2t$ within a negligible degree of error. If the surge is of relatively low current value the acceleration and deceleration forces of the moving parts will both be correspondingly small. If the surge is of a relatively high current value the acceleration and deceleration forces will both be correspondingly large so that as long as we allow the pointer to come to rest before the record is printed the recording position will be porportional to $I^2t$. The zero return magnet 20 is energized from a constant voltage source and hence produces a zero return torque which is constant for a given deflection and is proportional to the up-scale deflections and reduces to approximately a zero value at the zero position of the shaft.

I provide a timing system responsive to the operation of relay 12' for delaying the printing of the position of the recording arm 21 for a suitable period after the end of each surge and also for controlling the time sequence of operations necessary to print the record and restore the printing arm to a zero position in readiness for the next surge.

The timing system and the relays controlled thereby are supplied by a constant voltage source 40 which, for the condenser and resistance values hereinafter mentioned by way of example, may be a 220 volt, 60 cycle, A. C. source.

Connected across source 40 is a relay 41, a vacuum tube 42, and a 2 microfarad supply condenser 43 in series relation. When current flows through this circuit, relay 41 is energized and condenser 43, if not by-passed, is charged.

Surge responsive relay 12' operates a three-pole double throw switch 44, the primary purpose of which is to connect a 0.1 microfarad transfer condenser 45 and a 0.3 microfarad transfer condenser 46 across condenser 43 to transfer a portion of the charge on supply condenser 43 to the smaller condensers 45 and 46 when a surge starts and to connect condenser 45 across the filament and the control grid of vacuum tube 42 and condenser 46 across the filament and the control grid of a vacuum tube 47 when the surge has ended.

In the energized position of relay 12' the connections of this switch, as first mentioned above, are made through the upper stationary contacts of the switch 44, and when relay 12' is deenergized, which is the condition shown, the second mentioned connections are made through the lower sets of stationary contacts of switch 44.

Vacuum tube 47 is connected across source 40 in series with a relay 48 having contacts arranged to by-pass and discharge condenser 43 through a 100 ohm resistance 49 when relay 48 is deenergized.

It will also be noted that when switch 44 is in the deenergized position shown and condensers 45 and 46 are connected to bias the tubes 42 and 47 respectively, the biasing charges of these condensers leak off through ½ megohm resistances 50 and 51 respectively, which resistances are at this time connected across condensers 45 and 46 respectively.

Stabilizing resistances of about 1/10 megohm each are connected in the grid leads of tubes 42 and 47.

Relay 41 when energized energizes relay 36 through wire 52, and printing relay 38 through contact 53 of relay 36 and wire 54. Relay 36 in addition to performing the function previously described in connection with the control of the timing motor 29 serves when energized to open the circuit of printing relay 38 and to close the circuit of the zero return magnet 20 of the recording meter, through a contact 55 and wire 56.

In the idle or steady state condition of the timing system, relays 12', 41, 36, 38 and zero return magnet 20 will be deenergized. Tube 47 which is connected directly across source 40 through the coil of relay 48 will be passing current and relay 48 will be energized. Condenser 43 will be charged and condensers 45 and 46 discharged and the relay connections will be as represented in Fig. 1. No surge current will be flowing in the instrument coil 13 or in the coil of relay 12, and the galvanometer pointer will stand in a zero position with a stop 57 of its moving system resting against a zero stop 58.

To assist in explaining the operation of the apparatus there follows an approximate time table of events during a surge cycle. The first column of the table gives the timing of the events starting with the steady state condition. The several other columns indicate the condition of the different elements identified at the head of each column at the different times indicated. The first horizontal line of the table below the identifying headings gives the steady state or idle condition mentioned above, and this is the condition of the apparatus as shown in Fig. 1.

| Time | Relay | | Currents | | | Condenser voltages | | | Coil currents | |
|---|---|---|---|---|---|---|---|---|---|---|
| | 12' | 41 | 48 | 36 | 38 | 43 | 45 | 46 | 13 | 20 |
| | Amperes | Milli-amperes | Milli-amperes | | | | | | Amperes | Milli-amperes |
| Steady state | 0 | 0 | 20 | 0 | 0 | 300 | 0 | 0 | 0 | 0 |
| Surge starts | 5 | Neg. | 20 | 0 | 0 | 240 | 240 | 240 | .5 | 0 |
| Surge stops | 0 | 0 | 0 | 0 | 0 | 240 | 240 | 240 | 0 | 0 |
| .1 sec. later | 0 | 20 | 0 | Energized | Energized | 0 | 30 or less | 150 | 0 | 0 |
| .11 sec. after surge stops | 0 | 20 | 0 | ---do--- | ---do--- | 0 | 0 | 125 | 0 | 30 |
| .4 sec. after surge stops | 0 | 20 | 20 | ---do--- | 0 | 10 | 0 | 30 or less | 0 | 30 |
| .5 sec. after surge stops | 0 | 0 | 20 | 0 | 0 | 300 | 0 | 0 | 0 | 0 |

In the steady state condition relay 48 is energized by about 20 milliamperes. All of the other relays and coils indicated are deenergized. Condenser 43 has a charge of about 300 volts since it tends to charge up to the peak voltage of the 220 volt A. C. source 40. When a surge starts the conditions indicated in the next line of the table exist. Relay 12 is energized and operates switch 44 to the raised position and the charge on condenser 43 is distributed between all three condensers to give voltages of about 240. There may be some slight flow of current through tube 42 because of this lowering in voltage but not enough to operate relay 41, and its current is indicated as being negligible.

The surge current flows through galvanometer coil 13 and relay coil 12', and its value has been indicated as 5 amperes, which may be considered a normal surge value in the current transformer secondary, but it will be understood that this current may vary in accordance with the primary surge current value. The galvanometer of course now starts to move the recording pointer upscale until the surge stops and we arrive at the condition shown in line three of the table. The length of the surge may vary. A common length of a spot welding current surge is six cycles of a 60 cycle frequency. When the impulse stops (line three of the table) relay 12 and coil 13 are deenergized. Switch 44 drops to the lower contacts. The 240 volt charge on condenser 46 is impressed across filament and grid of tube 47 in a direction to stop current flow therethrough and relay 48 is deenergized, and this short-circuits condenser 43 through resistance 49 and the voltage of condenser 43 drops rapidly toward the zero value indicated. The 240 volt charge on condenser 45 is impressed between filament and grid of tube 42 and is in a direction to hold this tube at cut off.

The damping element of the galvanometer is now bringing the up-scale movement of the pointer to a stop. About one-tenth second later the conditions in line four of the table will exist. The charge on condenser 45 has leaked off through resistance 50 until its charge is 30 volts or less and tube 42 is no longer held at cut off and passes about 20 milliamperes current through resistance 49, the closed contacts of deenergized relay 48 and the coil of relay 41. Relay 41 is energized and has closed its contacts and has energized normally deenergized print relay 38 which prints the position of the now stationary pointer 21 at the top of its swing. Relay 36 which is slow acting as compared to the print relay is energized and has just started pulling in its armature. The conditions rapidly change to those indicated in line five of the table at about .11 second after the surge has stopped. Here relay 36 has completed its pull in operation and deenergized print relay 38 and momentarily energized the coil of the normally deenergized zero return device 20, which starts returning pointer 21 towards a zero position with a torque proportional to the pointer deflection from zero. The charge on condenser 46 has been leaking off through resistance 51 but tube 47 is still held at cut off.

.4 second after the surge stops the conditions in line six of the table will exist. The pointer has been returned to zero position against stop 53, with the return coil still energized but now in a rotary position where its returning torque is very small and nearly of a zero value. This, together with the checking action of the magnetic damping element, has quickly brought the pointer to a zero position yet without shock and without tendency to bounce away from the stop. The charge on condenser 46 has leaked away until tube 47 passes current, relay 48 is energized and the current through tube 42 and relay 41, instead of being by-passed through the contacts of relay 48, starts to charge condenser 43 and has dropped somewhat below 20 ma. but is still sufficient to maintain relay 41 in its energized position. One-half second after the surge has stopped, the conditions in line seven of the table will exist. At this time condenser 43 has become substantially charged, the flow of current through tube 42 and relay 41 has stopped or dropped to a negligible value, and the contacts of relay 41 are open, relay 36 is deenergized and returned to open position, thereby deenergizing the zero return device 20. This returns the apparatus to the steady state condition upon completing the cycle of events and the apparatus is in readiness to record the next surge.

It is seen that this cycle is completed in one-half second after the surge stops. Assuming the average length of surge is one-tenth second in duration, a normal surge may occur and be recorded and the apparatus conditioned for recording the next surge in 0.6 second. Thus surges of the character contemplated may occur at the rate of 100 per minute and be measured and recorded by this apparatus adjusted as above described. It will be understood that the timing cycle may be changed by changing the times required for condensers 45 and 46 to discharge and remove the cut off bias on tubes 42 and 47. For example, to decrease the time delay caused by condenser 46 and tube 47 I may either reduce the value of condenser 46 or give it a higher discharge rate by decreasing resistance 51. Also the time delay intervals of both tubes 42 and 47 may be reduced by reducing the capacity of condenser 43. This will result in a lower initial charge on condensers 45 and 46 and hence give them a shorter discharge interval. These and other adjustments may be made to vary the timing sequence and while certain circuit constants and timing conditions have been given by way of example, the invention is not limited to the particular time cycle of adjustment described.

So long as surges come in frequently, the timing motor 29 will remain in operation, but if the surges cease occurring frequently the time delay means consisting of finger 34 of contact wheel 31 will, after a short time delay, rotate into contact with resilient contact 32 to open the timing motor circuit and stop the advance of the recording paper.

The welding circuit is usually controlled by a vacuum tube apparatus (not shown) such that a welding surge lasts for a definite number of cycles. If anything happens to such control apparatus to shorten or lengthen the surge, or if such control apparatus becomes defective to vary the voltage across the electrodes or to skip a portion of the normal surge, while conditions at the welding electrodes remain normal the increase or decrease in the $I^2t$ product measured and recorded by my surge recorder will immediately show up by the records produced. Likewise, if the power control apparatus functions properly but the resistance between the weld electrodes incident to a welding operation varies from normal due to failure of proper contact pressure, improper spacing of electrodes or defective material being welded so as to change the factor I in the product measured by the recorder apparatus, such defective condition will be immediately revealed by the variation from normal of the records obtained. Similarly if the line supply voltage varies to affect I it will be revealed in the record.

The nature of the records obtained are shown by the dots indicated at 60 on record sheet 22. As illustrated, the printing rod 23 is provided with a removable or adjustable section 61 of insulating material such as rubber. At the lateral boundaries of this insulated section there are provided raised printing ridges 62, which, when the printing relay 38 is energized, print boundary lines 63 on the record sheet 22 when the records 60 are printed.

The front section 64 of the printing rod which holds rubber part 61 and the boundary printing ridges 62 is either removable or adjustable. In the example shown, the adjustable part 64 is fastened to the main part 23 of the printing rod by screws 65. When these screws are removed, part 64 with insulating part 61 and the boundary printing ridges may be moved laterally or removed entirely and replaced by another section 64' (see Fig. 3) having the insulated part 61' wider or narrower than the part 61 of Fig. 1 or at a different lateral position or both and with boundary printing ridges 62' at its lateral edges. The boundary printing lines 63 are helpful in the calibration and use of the apparatus. These lines are so spaced with respect to the calibration of the instrument as to mark the upper and lower limits of satisfactory welding surges and so long as the records fall between these lines, as shown for example by the records 60 in Fig. 1, the welder is assured that the welding surges contain the proper amount of heat energy to give satisfactory welds.

If the records 60 go lower as at point 60a or higher as at point 60b than the limits set, it may be assumed that something is wrong with the power control apparatus or the welding apparatus, and the trouble should be located and corrected before further welding operations are made.

If pointer 21 is outside the boundary limits 62 when a record is made such as at 60a or 60b, the pointer is opposite a conducting portion of the printing rod and an electric contact is made between the metal pointer and metal rod at the instant of printing. This contact arrangement is included in a circuit which may include one or more of the following: a visual signal 66, an audible signal 67, a control relay 68, as well as a source of supply 69. The relay 68 may be arranged to shut off the power supply to the welder so that no further use thereof may proceed until the apparatus has been checked and the condition corrected. When the pointer is opposite the insulated part 61 when the record is printed the lower edge of the insulated part strikes the pointer and hence the signal or control circuit is not energized for satisfactory welding surges. The connection of the signalling circuit to the recording pointer shaft should be through a connection such as a weak spiral which has negligible turning effect on the shaft in any position.

In order to avoid trouble with the carbon paper belt 25 and record paper 22, I have found that certain precautions are very desirable. It is difficult to provide a carbon paper or cloth belt 25 of exactly the same length at both ends. For example, the belt may be formed by a sheet of carbon paper of the desired width and length which, when the ends are pasted together, form a belt. In pasting the ends of the sheet together to form a belt, one peripheral side of the belt may be found to be $\frac{1}{8}$ inch longer than the other in spite of care being taken to prevent any such discrepancy. Such a belt when simply placed on parallel rollers such as the rollers 24 and 70 and driven as here contemplated, will not run true but will invariably work endwise towards that end of the belt which is the longest. Even collars such as collars 71 shown at the ends of roller 24 will not prevent an uneven belt of carbon paper from working endwise and climbing out over such collar. This troublesome difficulty has been overcome by the use of a wrinkle bar 72 having bends 73 beneath the paper belt near the ends of such belt where it is fed onto roller 24. These bends crowd the end edges of the paper belt inward and cause it to wrinkle up slightly just as it passes into platten roller 24 and the belt is made sufficiently loose to permit this without tearing. When the belt passes over roller 24, the chart paper 22 is outside and under sufficient tension to drive the carbon paper belt and to flatten out the wrinkles in and without causing creasing of the carbon paper. This pressing and driving action of chart 22 on the carbon paper over a limited periphery of roller 24 allows the belt to adjust itself, the wrinkles in the long end of the belt apparently being pressed out in a forward direction and the wrinkles in the short end of the belt apparently being pressed out in a retarding direction to the extent necessary to allow an uneven belt to be driven without working endwise. Actually, the long end of the belt is driven faster than the short end, due to the adjustment allowed incident to the smoothing out of the wrinkles to the extent necessary to compensate for the difference in peripheral length of the belt at its opposite ends.

The chart 22 used is a relatively thin lightweight paper in order that it will be sufficiently transparent to enable the records, which are made on the under side of the chart, to be clearly visible therethrough. It is impracticable to drive such a chart with a toothed drum having driving teeth projecting through holes punched along the edges of the chart. The chart driving arrangement used, and which has been referred to generally above as a driving drum 28, requires some further explanation. The driving drum 28 may be constructed as indicated in Fig. 2 having a soft rubber cylindrical driving section 74 at its center and soft rubber inwardly tapered guiding sections 75 at its two ends. The remainder of this drum is made of reduced diameter and may be made up of metal parts which serve as supporting and spacing parts, but do not enter into driving contact with the paper. Beneath driving drum 28 is another drum made up of a long central part 76 and short end parts 77. These three parts are so supported as to be freely rotatable independently of each other. Part 76 is pressed in driving contact with suction part 74 of drum 28 and the chart is gripped between these two parts and they constitute the main driving elements of the arrangement. End roller parts 77 are slightly smaller in diameter than part 76 and they are in driving contact with the outer cylindrical portions of suction guide roller parts 75. The maximum diameter of parts 75 is slightly greater than the diameter of cylindrical part 74, but the minimum diameters of these parts are the same. The chart is of a width equal to the distance between the inner ends of parts 75 and is normally driven in a central position with its end edges in line with the inner ends of the parts 75. In case the chart tends to creep towards one side or the other of such central position, one edge rides up on the cone-shaped surface of part 75 and there is an immediate tendency for such edge to be driven faster than the middle of the chart due to the increased diameter of part 75 and the fact that parts 74 and 75 are driven at the same speed. This straightens the chart and returns it to a central driving position. This correcting effect of the cone-shaped roller parts 75 at any instant is in proportion to extent of chart displacement from a central position at the driving drum. Guide collars 71 maintain the chart properly centered under the recording position and hence such correcting effects as occur at the driving drum do not displace the record on the chart.

What I claim as new and desire to secure by Letters Patent of the United States is:

1. Surge responsive circuit control means comprising in combination with the circuit to be controlled, a grid controlled vacuum tube and a storage condenser in series relation in said circuit, a transfer condenser, a transfer switch operated in one direction in response to the beginning of a surge for connecting said condensers in parallel to equalize the voltages thereon and operated in the opposite direction in response to the ending of a surge for impressing the voltage of the transfer condenser on the grid of said tube to bias it to cut off and to establish a circuit across said transfer condenser for discharging it and thus rendering said tube conducting in a predetermined fraction of a second, and other means responsive to the last mentioned operation of said transfer switch for discharging said supply condenser so that as soon as said tube becomes conducting said circuit will be energized therethrough and remain energized until said supply condenser is recharged.

2. Surge responsive control means including a circuit to be controlled comprising a vacuum tube and a supply condenser in series relation, a normally energized relay which when deenergized establishes a short circuit about said supply condenser, a second vacuum tube in series with the normally energized relay, a pair of transfer condensers smaller than the first mentioned condenser, a transfer switch operated in response to a surge for connecting said transfer condensers across said supply condenser and operated in response to the cessation of a surge to disconnect said condensers from each other and connect the transfer condensers to produce cut off biasing voltages on said two vacuum tubes, and means for gradually discharging said transfer condensers when connected as last mentioned.

3. Surge responsive timing means for controlling a circuit in timed relation with a surge, said means including the circuit to be controlled, a grid controlled vacuum tube and a supply condenser in said circuit, a normally energized relay which when deenergized closes a discharge circuit across said supply condenser, a circuit including the energizing winding of the normally energized relay and a second grid controlled vacuum tube, a pair of transfer condensers, a transfer switch, means responsive to a surge for operating said transfer switch to connect the three condensers in parallel to transfer charges from the supply condenser to the transfer condensers and to disconnect said condensers and connect the supply condensers to bias the grids of said vacuum tubes to cut off when the surge ceases, resistance discharge circuits for said transfer condensers completed when said condensers are connected to bias said tubes, the tube included in the circuit to be controlled becoming conductive, first to determine the time of energizing of the control circuit and the other tube becoming conducting thereafter to determine the time of deenergizing of the control circuit.

4. In combination with a control circuit, timing means for controlling said circuit in timed relation with current surges, said means including a grid controlled vacuum tube and a supply condenser connected in series relation in said circuit, a normally energized relay which when deenergized closes a discharge circuit across said supply condenser, a second grid controlled vacuum tube in series with said relay, a pair of transfer condensers, a transfer switch, surge responsive means for operating said transfer switch to connect said condensers in parallel when a surge starts and interrupting said parallel connection, and individually connecting the transfer condensers to the control grids of the two tubes to bias said tubes to cut off when a surge stops, resistance discharge circuits for said transfer condensers, completed when a surge stops, to progressively remove the grid bias of the first and second mentioned tubes at predetermined different times after a surge stops to cause the timed energizing and deenergizing of the control circuit.

THEODORE A. RICH.